United States Patent
Kim et al.

(10) Patent No.: US 6,549,246 B1
(45) Date of Patent: Apr. 15, 2003

(54) METHOD FOR DRIVING PROJECTION CATHODE RAY TUBE

(75) Inventors: Sang-kyun Kim, Seoul (KR); Duk-sung Park, Suwon (KR)

(73) Assignee: Samsung Display Devices Co., Ltd., Kyungki-Do (KR)

( * ) Notice: Subject to any disclaimer, the term of this patent is extended or adjusted under 35 U.S.C. 154(b) by 0 days.

(21) Appl. No.: 09/313,057

(22) Filed: May 17, 1999

(30) Foreign Application Priority Data

May 18, 1998 (KR) ............................................. 98-17861

(51) Int. Cl.$^7$ ................................................. H04N 5/74
(52) U.S. Cl. ...................... 348/776; 348/634; 348/325; 348/377; 348/379; 348/380; 315/333; 315/91
(58) Field of Search ................................ 348/776, 637, 348/634, 325, 333.13, 377, 378, 379, 780, 380, 382; 315/333, 91; H04N 5/74

(56) References Cited

U.S. PATENT DOCUMENTS

| | | | | | |
|---|---|---|---|---|---|
| 3,680,042 A | * | 7/1972 | Brunn | ...................... | 340/853.9 |
| 3,924,067 A | * | 12/1975 | Arneson | ...................... | 348/377 |
| 3,968,394 A | * | 7/1976 | Todd, Jr. | ...................... | 313/465 |
| 4,110,790 A | * | 8/1978 | Wheeler | ...................... | 348/625 |
| 4,259,691 A | * | 3/1981 | Monahan et al. | ........... | 348/327 |
| 4,370,674 A | * | 1/1983 | Johnson et al. | ............. | 315/383 |
| 4,599,654 A | * | 7/1986 | Monroe | ...................... | 348/363 |
| 4,604,555 A | * | 8/1986 | Karaki | ...................... | 315/383 |
| 4,652,920 A | * | 3/1987 | Dietz | ...................... | 348/516 |
| 4,716,461 A | * | 12/1987 | Hinn | ...................... | 348/637 |
| 5,003,394 A | * | 3/1991 | Lagoni | ...................... | 348/673 |
| 5,036,260 A | * | 7/1991 | George | ...................... | 315/384 |
| 5,200,829 A | * | 4/1993 | Lagoni | ...................... | 348/380 |
| 5,206,728 A | * | 4/1993 | Kim | ...................... | 348/564 |
| 5,258,828 A | * | 11/1993 | Sano et al. | .................. | 348/658 |
| 5,714,842 A | * | 2/1998 | Krause et al. | ................. | 315/1 |
| 5,783,913 A | * | 7/1998 | George | ...................... | 315/371 |
| 5,847,778 A | * | 12/1998 | Muto et al. | ................. | 348/759 |
| 5,889,558 A | * | 3/1999 | Ikeda | ...................... | 348/173 |
| 5,892,544 A | * | 4/1999 | Ikegami et al. | ............ | 348/327 |
| 5,894,327 A | * | 4/1999 | Griepentrog | ................ | 315/381 |
| 5,969,486 A | * | 10/1999 | Webb et al. | ................. | 315/370 |
| 5,977,726 A | * | 11/1999 | Shishido | ..................... | 313/414 |
| 6,211,908 B1 | * | 4/2001 | Griepentrog | .................... | 315/1 |
| 6,226,037 B1 | * | 5/2001 | Griepentrog | ................ | 315/370 |

* cited by examiner

*Primary Examiner*—John Miller
*Assistant Examiner*—Linus H. Lo
(74) *Attorney, Agent, or Firm*—Lowe Hauptman Gilman & Berner, LLP

(57) ABSTRACT

In a projection CRT, an image of high brightness is displayed on a screen as an electron beam emitted from an electron gun is scanned according to an image driving signal. The image is magnified and projected through a lens unit. Here, voltage of a direct current component of the image driving signal is lower than threshold voltage of the screen for scan time and also lower than threshold voltage of the electron gun for retrace time.

11 Claims, 2 Drawing Sheets

METHOD FOR DRIVING PROJECTION CATHODE RAY TUBE

BACKGROUND OF THE INVENTION

1. Field of the Invention

The present invention relates to a method for driving a projection cathode ray tube (CRT), and more particularly, to a method for driving a projection CRT by which an image of high brightness displayed on a screen is magnified and projected through a lens unit.

2. Description of the Related Art

In a typical projection CRT, since an image having high brightness should be displayed on a screen, a threshold voltage of the screen is relatively high. Here, the threshold voltage of a screen means a boundary voltage which determines emission of the screen. The threshold voltage of a screen is also referred to as a cutoff voltage of a screen.

In a laser projection CRT, a laser pixel array is attached on a disk formed of sapphire material. Each laser pixel is provided with three mono crystals respectively generating red (R), green (G), and blue (B) laser beams based on the energy of an electronic beam, and a pair of reflection mirrors facing each other. The energy needed to generate a laser beam in each mono crystal is higher than that needed to generate light from a fluorescent material of a common CRT. In other words, the threshold voltage of a screen of a laser projection CRT is higher than that of a screen of a common CRT. Of course, the threshold voltage of an electron gun of a laser projection CRT is the same as that of an electron gun of a common CRT. Here, the threshold voltage of an electron gun meals the voltage needed to generate an electron beam from an electron gun. The threshold voltage of the electron gun is referred to as a cutoff voltage of an electron gun.

As shown in the above, there is a wide gap between the threshold voltages of the screen and the electron beam in a projection CRT. However, in an image driving signal for driving the electron gun, the voltages of an alternating-current component should be determined according to the threshold voltage of the screen. That is, the voltage of a direct-current component is set lower than the threshold voltage of the screen and higher than the threshold voltage of the electron gun. FIG. 1 shows a waveform of an electronic beam from the electron gun. Referring to the drawing, voltages of an alternating current component of the image driving signal should be set based on the threshold voltage $V_{SCN}$ of the screen. Accordingly, in view of the electron gun, the voltage $V_{OVR}$ difference between the threshold voltage $V_{SCN}$ of the screen and the threshold voltage $V_{GUN}$ of the electron gun is applied excessively. The area of FIG. 1 corresponds to the amount of the excessive energy due to the voltage difference $V_{OVR}$. Since the voltage of a direct current component of the image driving signal is set higher than the threshold voltage $V_{GUN}$, the electron gun continuously emits electron beams to the screen. Thus, the screen and the electron gun are easily deteriorated and their lives are shortened. Also, since the temperature of the screen increases relatively, power required for cooling the screen is consumed more. Furthermore, contrast of the screen displayed is lowered relatively.

SUMMARY OF THE INVENTION

To solve the above problem, it is an objective of the present invention to provide a method for driving a projection CRT by which unnecessary electron beams are not emitted from the electron gun.

Accordingly, to achieve the above objective, there is provided a method for driving a projection CRT by which an image of high brightness is displayed on a screen as an electron beam emitted from an electron gun is scanned according to an image driving signal and the image is magnified and projected through a lens unit, in which voltage of a direct current component of the image driving signal is lower than threshold voltage of the screen for scan time and also lower than threshold voltage of the electron gun for retrace time.

BRIEF DESCRIPTION OF THE DRAWINGS

The above objective and advantages of the present invention will become more apparent by describing in detail a preferred embodiment thereof with reference to the attached drawings in which.

DETAILED DESCRIPTION OF THE INVENTION

Figure 1:
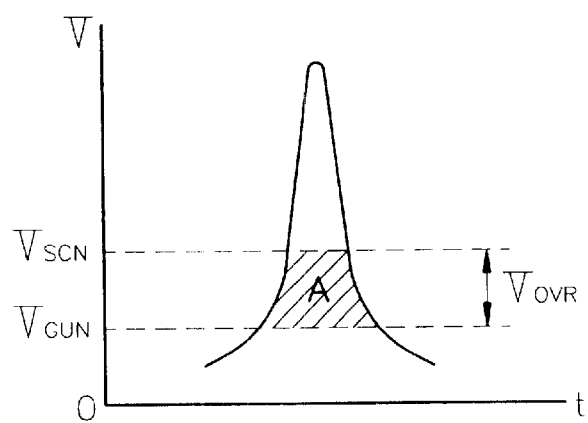
FIG. 1 is a graph showing a waveform of an electron beam for explaining a conventional method for driving a projection CRT.
Figure 2:
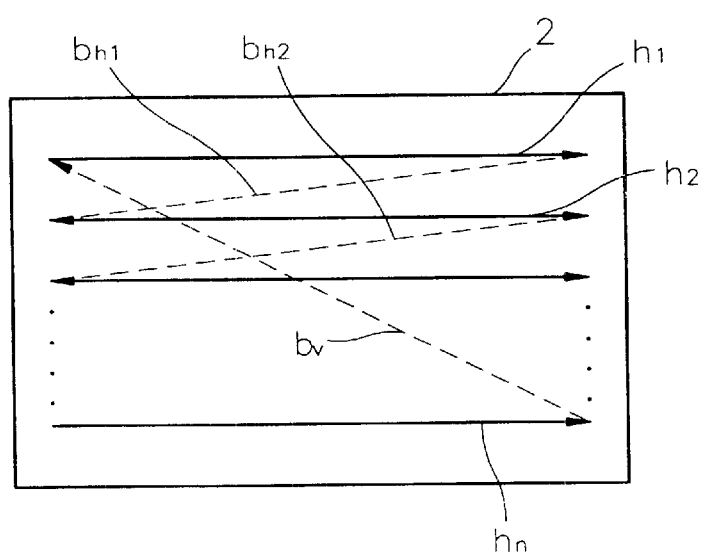
FIG. 2 is a view showing the trace of an electron beam scanning on a screen, for explaining a preferred embodiment of the present invention.

Referring to FIG. 2, from a start point of a frame, the first horizontal scanning is made in a direction $h_1$ on a screen 2. The voltage of a direct current component of an image driving signal to be applied for the first horizontal scan time is set to be lower than the threshold voltage ($V_{SCN}$ of FIG. 1) of the screen and higher than the threshold voltage ($V_{GUN}$ of FIG. 1) of an electron gun. Next, the first horizontal retracing is performed in a direction $b_{h1}$. The voltage of a direct current component of the image driving signal to be applied for the first horizontal retrace time is set to be lower than the threshold voltage $V_{GUN}$ of the electron gun. Next, the second horizontal scanning is performed in a direction $h_2$. The voltage of a direct current component of the image driving signal to be applied for each horizontal scan time is constant. Then, the second horizontal retracing is performed in a direction $b_{h2}$ and the above steps are repeated. The voltage of a direct current component of the image driving signal to be applied for each horizontal retrace time is equal to each other. When the final horizontal scanning of a frame in a direction $h_n$ is completed, a vertical retracing in a direction $b_v$ is performed and the next frame begins. The voltage of a direct current component of the image driving signal to be applied for vertical retrace time is set to be lower than the threshold voltage $V_{GUN}$ of the electron gun.

Figure 3:
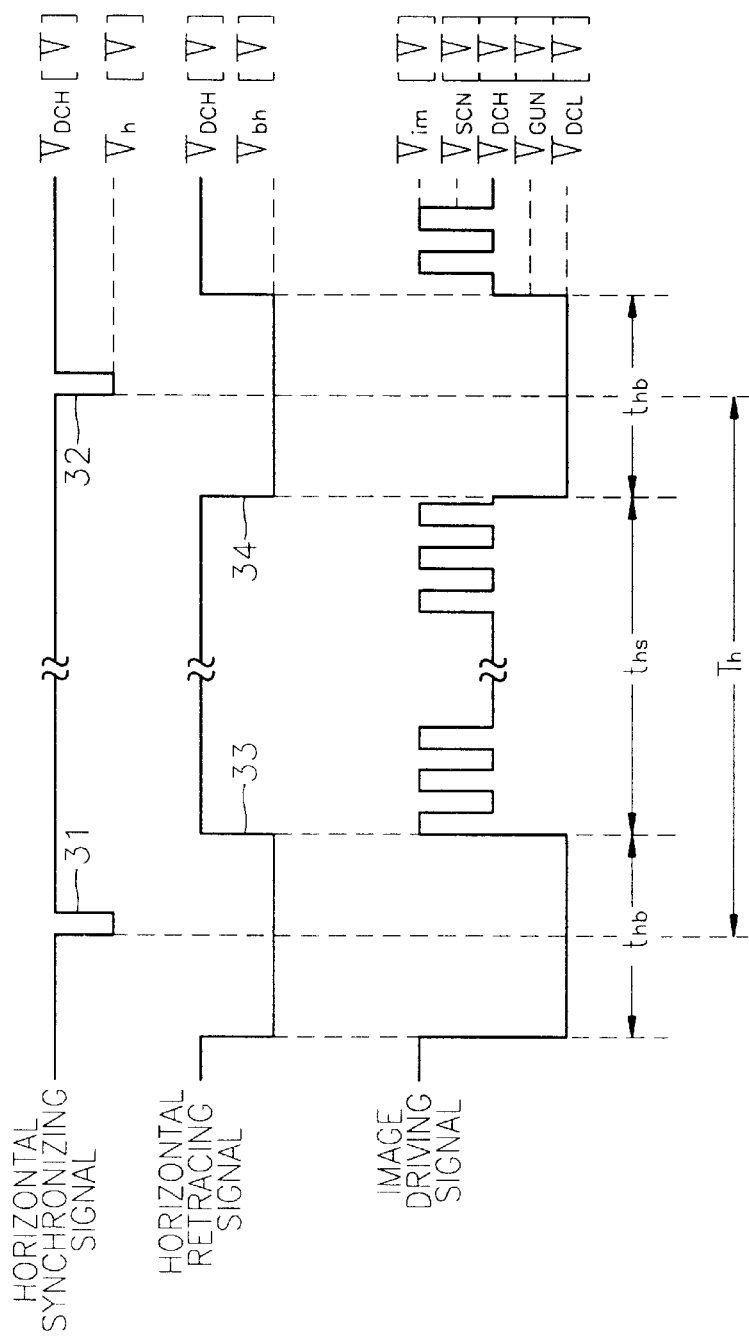
FIG. 3 is a view showing a waveform of control signals according to the preferred embodiment of the present invention.

FIG. 3 shows waveforms of control signals according to the present invention.

Referring to the drawing, a horizontal synchronizing signal includes negative pulses 31 and 32. A horizontal period $T_h$ begins at the point where any negative pulse (31 or 32) is generated. The horizontal synchronizing signal has a first direct current voltage $V_{DCH}$ while the negative pulses 31 and 32 are not active. The voltage $V_h$ of the negative pulses 31 and 32 of the horizontal synchronizing signal is lower than the first direct current voltage $V_{DCH}$.

The horizontal retracing signal includes negative pulses 33 and 34. The width of the negative pulses 31 and 32 of the horizontal synchronizing signal is narrower than that of the respective negative pulses 33 and 34 of the horizontal retracing signal. Also, the period during which the negative pulse 31 or 32 of the horizontal synchronizing signal is active is included in the period during which the negative pulse 33 or 34 of the horizontal retracing signal is active, i.e., a horizontal retracing signal $t_{hb}$. The horizontal retracing signal has the first direct current voltage $V_{DCH}$ for the period during which the negative pulses 33 and 34 are not active, i.e., a horizontal scan time $t_{hs}$. The voltage of the negative pulses 33 and 34 of the horizontal retracing signal $V_{bh}$ is lower than the first direct current voltage $V_{DCH}$.

The image driving signal has a direct current component which exists only for the horizontal retrace time $t_{hb}$ and includes both direct current component and alternating current component for the horizontal scan time $t_{hs}$. The voltage $V_{DCL}$ of the direct current component of the image driving signal to be applied for the horizontal retrace time $t_{hb}$ is set to be lower than the threshold voltage $V_{GUN}$ of the electron gun. Accordingly, electron beams are not emitted from the electron gun for the horizontal retrace time $t_{hb}$. The voltage $V_{DCH}$ of the direct current component of the image driving signal to be applied for the horizontal scan time $t_{hs}$ is set to be lower than the threshold voltage $V_{SCN}$ of the screen and higher than the threshold voltage $V_{GUN}$ of the electron gun. Obviously, the pulse voltage $V_{im}$ of the alternating component of the image driving signal to be applied for the horizontal scan time $t_{hs}$ is set to be higher than the threshold voltage $V_{SCN}$ of the screen.

As described above, according to the method for driving a projection CRT according to the present invention, since unnecessary electron beams are not emitted from the electron gun, the screen and the electron gun are prevented from deterioration and their lives are extended. Also, as the temperature of the screen decreases relatively, power required for cooling the screen is consumed less. Further, contrast of the screen displayed is improved relatively.

It is noted that the present invention is not limited to the preferred embodiment described above, and it is apparent that variations and modifications by those skilled in the art can be effected within the spirit and scope of the present invention defined in the appended claims.

What is claimed is:

1. A method of driving a projection CRT, comprising the steps of:
    displaying an image of high brightness on a screen as an electron beam emitted from an electron gun is scanned across the screen according to an image driving signal; and
    magnifying and projecting said image through a lens unit;
    wherein a voltage of a direct current component of said image driving signal is lower than a threshold voltage of said screen for a scan time period and also lower than a threshold voltage of said electron gun for a retrace time period;
    wherein the voltage of the direct current component of said image driving signal is higher than the threshold voltage of said electron gun for said scan time period.

2. A method of driving a projection CRT, comprising the steps of:
    displaying an image of high brightness on a screen by emitting an electron beam from an electron gun and scanning the electron beam across the screen according to an image driving signal; and
    magnifying and projecting said image through a lens unit;
    wherein a maximum value of a voltage of said image driving signal, during a retracing period, is lower than a threshold voltage of the electron gun so that the electron beam is not emitted during said retracing period;
    wherein the voltage of said image driving signal during said retracing period is kept constantly at a level lower than the threshold voltage of the electron gun; and
    wherein a minimum value of the voltage of said image driving signal during a scanning period is higher than the threshold voltage of the electron gun so that the electron beam is continuously emitted during said scanning period.

3. The method of claim 2, wherein said minimum value is lower than a threshold voltage of said screen.

4. The method of claim 3, wherein said image driving signal includes a DC voltage component having said minimum value, and an AC voltage component overlaying said DC voltage component, said AC voltage component comprising a plurality of voltage peaks higher than the threshold voltage of said screen.

5. A method of driving a projection CRT, comprising the steps of:
    displaying an image of high brightness on a screen by emitting an electron beam from an electron gun and scanning the electron beam across the screen according to an image driving signal; and
    magnifying and projecting said image through a lens unit;
    wherein a maximum value of a voltage of said image driving signal, during a retracing period, is lower than a threshold voltage of the electron gun so that the electron beam is not emitted during said retracing period; and
    wherein a minimum value of the voltage of said image driving signal during a scanning period is higher than the threshold voltage of the electron gun so that the electron beam is continuously emitted during said scanning period.

6. The method of claim 5, wherein said minimum value is lower than a threshold voltage of said screen.

7. The method of claim 6, wherein said image driving signal includes a DC voltage component having said minimum value, and an AC voltage component overlaying said DC voltage component, said AC voltage component comprising a plurality of voltage peaks higher than the threshold voltage of said screen.

8. A method of driving a CRT, comprising the steps of:
    a) emitting an electron beam from an electron gun and scanning, during a scanning period, the electron beam along one line of a plurality of lines of a screen;
    b) repositioning, during a retracing period, the electron beam from said line to the next line to be scanned; and
    c) repeating steps a) and b) until all said lines have been scanned thereby displaying an image on the screen;
    wherein the electron beam is not emitted during said retracing period; and
    wherein an image driving signal is applied to the electron gun, a voltage of said image driving signal is lower than the threshold voltage of said electron gun during entirely said retracing period so that the electron beam is not emitted during entirely said retracing period, and higher than the threshold voltage of said electron gun during entirely said scanning period so that the electron beam is continuously emitted during entirely said scanning period.

9. The method of claim 8, wherein said image driving signal includes
    a DC voltage component having a value lower than a threshold voltage of said screen, and an AC voltage component overlaying said DC voltage component, said AC voltage component comprising a plurality of voltage peaks higher than the threshold voltage of said screen.

10. The method of claim 8, wherein the CRT is a projection-type CRT, said method further comprising the step of magnifying and projecting said image through a lens unit.

11. The method of claim 8, wherein said retracing period includes horizontal and vertical retracing periods during which the electron beam is repositioned from one of said lines to the immediately adjacent line, and from the last line to the first line, respectively.

* * * * *